US007162199B1

(12) United States Patent
Glickstein et al.

(10) Patent No.: US 7,162,199 B1
(45) Date of Patent: Jan. 9, 2007

(54) METHOD FOR REAL-TIME TEAM COORDINATION WITH UNREALIABLE COMMUNICATIONS BETWEEN TEAM MEMBERS

(75) Inventors: Ira Glickstein, Apalachin, NY (US); Robert J. Szczerba, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1327 days.

(21) Appl. No.: 09/886,787

(22) Filed: Jun. 21, 2001

Related U.S. Application Data (60) Provisional application No. 60/213,646, filed on Jun. 23, 2000.

(51) Int. Cl.
*H04H 1/00* (2006.01)

(52) U.S. Cl. .............. 455/3.02; 455/12.1; 455/518; 370/316; 370/260; 370/259; 370/270; 370/713; 370/100; 370/159; 370/165; 370/172; 370/180; 370/185; 370/705; 370/51; 370/58.9; 370/64

(58) Field of Classification Search ............ 455/3.02, 455/3.06, 12.1, 518, 519; 370/312, 316, 370/259, 260, 270; 705/51, 58, 9, 64; 713/100, 713/150, 159, 165, 171, 172, 180, 185
See application file for complete search history.

(56) References Cited

U.S. PATENT DOCUMENTS

| 4,425,639 A | 1/1984 | Acampora et al. ............. 370/50 |
| 4,741,245 A | 5/1988 | Malone ...................... 89/41.03 |
| 5,365,451 A | 11/1994 | Wang et al. ................. 364/449 |
| 5,594,425 A | 1/1997 | Ladner et al. ......... 340/825.06 |
| 5,748,148 A | 5/1998 | Heiser et al. ............... 342/457 |
| 5,835,487 A | 11/1998 | Campanella ................. 370/316 |
| 5,838,668 A | 11/1998 | Okada et al. ............... 370/312 |

(Continued)

OTHER PUBLICATIONS

Ahuja et a l, "Gross motion planning—A survey", ACM Computing survey, vol. 24, No. 3, pp. 219-291, Sep. 1992.*

*Primary Examiner*—Matthew Anderson
*Assistant Examiner*—Sujatha Sharma
(74) *Attorney, Agent, or Firm*—Burns & Levinson LLP; Jacob N. Erlich; Harvey Kaye (57) ABSTRACT

A system and method of coordinating team members, each team member having a mission processor, in real time for continued coordinated operation in the absence of reliable communications between team members. Prior to a mission, each team member is provided with common programs and data for a mission, the data including identity of programs and data supplied to other team members and providing to each team member a pseudo random seed for use in conjunction with random functions. Each team member is provided with an initial set of conditions, whereby each team member performs deterministically to generate a same plan for itself and each of the other team members. Each team member monitors for a transmission event and responds to a transmission event by generating a re-planning operation, whereby each team member will produce a coordinated replan for itself and each other team member, whereby the team members remain coordinated. The monitoring can be detecting the presence or absence of a scheduled transmission from a team member, or receiving a transmission from a broadcast source, or receiving a transmission directed to team members from a headquarters, or receiving a commercial satellite broadcast, or maintaining a receiver for receiving a burst transmission from another team member or receiving a transmission indicative of a condition as reported by a team member.

20 Claims, 3 Drawing Sheets

U.S. PATENT DOCUMENTS

| | | | |
|---|---|---|---|
| 6,185,430 B1 * | 2/2001 | Yee et al. | 455/519 |
| 6,240,188 B1 * | 5/2001 | Dondeti et al. | 380/284 |
| 6,463,260 B1 * | 10/2002 | Nagai | 455/12.1 |
| 6,484,028 B1 * | 11/2002 | Okada et al. | 455/428 |
| 6,694,253 B1 * | 2/2004 | Schroeder | 701/208 |
| 6,738,900 B1 * | 5/2004 | Hardjono et al. | 713/156 |
| 6,789,213 B1 * | 9/2004 | Kumar et al. | 714/13 |
| 6,816,705 B1 * | 11/2004 | Quan et al. | 455/12.1 |
| 6,880,100 B1 * | 4/2005 | Mora et al. | 714/4 |
| 6,885,864 B1 * | 4/2005 | McKenna et al. | 455/431 |

* cited by examiner

METHOD FOR REAL-TIME TEAM COORDINATION WITH UNREALIABLE COMMUNICATIONS BETWEEN TEAM MEMBERS

CROSS REFERENCE TO RELATED APPLICATIONS

The present invention is based upon and claims the benefit of provisional application Ser. No. 60/213,646 filed Jun. 23, 2000.

BACKGROUND OF THE INVENTION

1. Field of Invention

The present invention relates to a method for coordinating real-time actions of team members even in the absence of reliable two-way communication, and, more specifically to a method utilizing a technique for predicting eventualities that are unpredictable to non-team members.

2. Description of Prior Art

U.S. Pat. No. 4,425,639 for a satellite communications system with frequency channelized beams which provides for a satellite based communications system with ground stations.

U.S. Pat. No. 4,741,245 for a method and apparatus for aiming artillery with GPS Navstar for use of satellites to coordinate the aiming of mulitple dispersed ground artillery.

U.S. Pat. No. 5,594,425 for a locator device is used to located the position of a receiver.

U.S. Pat. No. 5,835,487 for a satellite direct radio broadcast system for direct audio broadcasting to receivers on the ground.

U.S. Pat. No. 5,838,668 for a satellite broadcast communications system is used for satellite broadcasting of information about future broadcasts and their content so that ground stations may determine whether they want to receive desired information and when to tune in for reception of such information.

3. Description of Related Art

There are many contexts in which team members want to coordinate their actions in real time and in which communications between members of the team may become unreliable.

Characteristics of relevant contexts may include the following:

The team members may be manned or unmanned, or a combination of the two;

The team members may be fixed or mobile, or a combination of the two;

The team members may be air, ground, water, or space-based, or a combination;

The team members may be people, robots, sensors, weapons, command posts, personnel vehicles, or material warehouses or transport vehicles, or a combination;

They are engaged in a dynamic, cooperative mission;

The mission requires highly coordinated action by team members;

The mission is subject to changes of circumstances that are likely to require continual re-planning and re-coordination; and At any given point in time, the remote team members may not be able to communicate directly with each other or up to their headquarters.

Possible reasons for lack of two-way communications include:

They are on opposite sides of a hill or other obstruction;

They are concerned that any transmission might be detected by competitive forces and give away their positions or intentions;

They are concerned that any transmissions may be intercepted and read by competitive forces and used against their own interests;

Their communications channels may be jammed by competitive forces;

They lack sufficient transmission power to reach their command headquarters, or each other;

They cannot access a satellite uplink due to lack of individual uplink bandwidth resources; or Two-way communications systems are not available due to storms, earthquake, floods, or other disasters.

One example of a scenario embodying characteristics listed above is a military operation.

Different team members need to perform different acts that need to be coordinated in order to accomplish a mission objective. At a particular time, a team member may need to be in radio silence and have to forego the opportunity to provide communication to a team member indicative of position or some other parameter. Another example is a rescue effort or emergency utility repair. A team member may find that communication is not possible because he has gone outside of a particular telephone cell or is within the cell, but the antenna tower has gone down.

The problem has not been solved satisfactorily previously. Currently, missions involving multiple teams have to be planned in extreme detail, with a n umber of contingency plans in case the original plan encounters expected obstacles. This requires a long lead time which needs a great expenditure of manpower. During mission execution, there is a requirement for continual communications between remote entities, and communications from the remote entities to headquarters to report status and, when required, invoke and coordinate contingency plans.

Prior art methods for executing a coordinated action are generally "brittle," i.e. the objective is achieved if all goes accordance to plan. The planning process is limited to information known prior to the mission. Contingency plans prepared in advance are limited to account for expected eventualities. However, these plans are either useless or worse than useless when unexpected eventualities occur.

There is currently no practical way to coordinate the real-time actions of team members if they lack reliable two-way communications.

SUMMARY OF THE INVENTION

It is therefore an object of the present invention to provide a method for coordinating actions of team members in which the team members operate in accordance with an initial set of instructions defining a plan and in which the plan may be modified dynamically in real time and in which the team members will remain coordinated even in the absence of two-way communications between them.

It is a more specific object to provide a method of the type described in which use of a brief window of opportunity for two-way communication or continuous one-way communication is maximized.

It is also a general object of the present invention to provide a method for team member coordination in both civilian and military situations of this type, in which the plans and actions of multiple team members may change dynamically in response to changes in circumstances, yet remain coordinated and predictable to team members and wherein the actions remain unpredictable to non-team members.

It is another more specific object of the present invention to provide a method of the type described in which plans are flexible rather than "brittle", i.e. unexpected contingencies as well as expected contingencies can be addressed.

It is also a general object of the present invention to provide a method of the type described in which "pseudo-centralized" planning and coordination for team members is utilized, i.e. the members can respond to changes such that updating of plans will seem centralized even when executed by the individual team members.

Briefly stated, in accordance with the present invention, there is provided a method in which a number of team members are each provided with an operating algorithm for performing a particular task, e.g. searching an area. The same pseudo-random seed algorithm is provided to each member. Common input data is provided to each team member along with a set of tasks and objectives to be accomplished in coordination with other team members. Since digital computers are totally deterministic, given an exact set of initial conditions and algorithms, each team member will come up with the exact same coordinated plan for itself and for each of the other team members. The mission should be executed according to the plan. If each team member does so, all will remain in coordination. During mission execution, the predictable-unpredictability method continually monitors for new broadcast information or for new information that may come by way of low-probability-of-detection burst transmissions whenever team members come within communications range. A transmission event occurs if any data is received in this manner, or, if a communications rendezvous is missed. The transmission event triggers a re-planning cycle. Each team member has the same pseudo random seed, and when plans are re-run, each team member will come up with the exact same coordinated plan for itself and each of the other team members.

The means and method by which the foregoing objects and features of invention are achieved are pointed out in the claims, forming the concluding portion of the specification. The invention, both as to its organization and manner of operation may be further understood by reference to the following description taken in connection with the following drawings in which:

DESCRIPTION OF THE PREFERRED EMBODIMENTS

There is currently no way to coordinate the real-time actions of geographically dispersed team members if they lack reliable two-way communications. This situation occurs in both civilian and military contexts. For example:

In the business context, a contract negotiator or bidder may not want to make a phone call, because that could tip off a competitor as to who her contacts are.

In the emergency services context, phone lines or cellphone towers may be down, or some of the police, fire, or rescue units may be beyond reliable two-way radio range.

In a space-exploration context, such as coordination of robot explorers on Mars, communications with Earth may not be practical due to the time delay, and communications with each other may be limited by terrain or distance.

In the peacekeeping context, there may be a need to coordinate sensitive negotiations with military action, without overtly revealing the connections between the two.

In the weapons inspection context, there may be a need to coordinate with covert team members, without revealing the fact that they exist.

In the military context, there may be a requirement for radio silence when in proximity to hostile forces.

In both civilian and military situations of this type, the plans and actions of multiple team members must change dynamically in response to changes in circumstances, yet remain coordinated and predictable to team members. Furthermore, when, as is often the case, competitive forces are involved, the plans and actions should remain unpredictable to forces opposing the team.

The shortcomings in the prior art revolve around the requirement that missions involving multiple players have to be planned in excruciating detail, with a number of contingency plans in case the original plan runs into expected obstacles. This method requires a great deal of long-lead planning time, which requires a high expenditure of manpower. During mission execution, there is a requirement for continual communications between remote team members, and communications from the remote team members to headquarters, to report status and, when required, invoke and coordinate contingency plans.

The limitations of the current methods include:

Production of somewhat brittle plans that work only if all goes exactly according to plan, Limitation of the planning process to information known prior to the mission, Lack of full exploitation of the near-real-time intelligence and status information that are now provided by Global Satellite Broadcasting and will, in the near future, be provided by the Tactical Internet, Contingency plans, prepared in advance, that, by their very nature, are limited to expected unfavorable eventualities, and are therefore worse than useless when unexpected events occur, and Heavy dependency upon continual availability of reliable communications between all players.

In the preferred form of the present invention, all team members in the team are capable of receiving general information, intelligence data and/or new or modified mission assignments via a broadcast communications link. This broadcast link could be from commercial broadcast sources originating in the remote territory, satellite broadcast originating from friendly sources, long-range HF radio, or other means. (Downlink broadcast bandwidth is generally more available than uplink individual bandwidth, and, especially if satellite-based, is less likely to be jammed or have detection security concerns than transmissions from remote units in hostile territory.)

On occasion, when their paths bring them into proximity, team members may be able to transmit bursts of data to each other, and relay data from other team members, using low probability of detection (LPD) means.

Organization of the Invention

Figure 1:
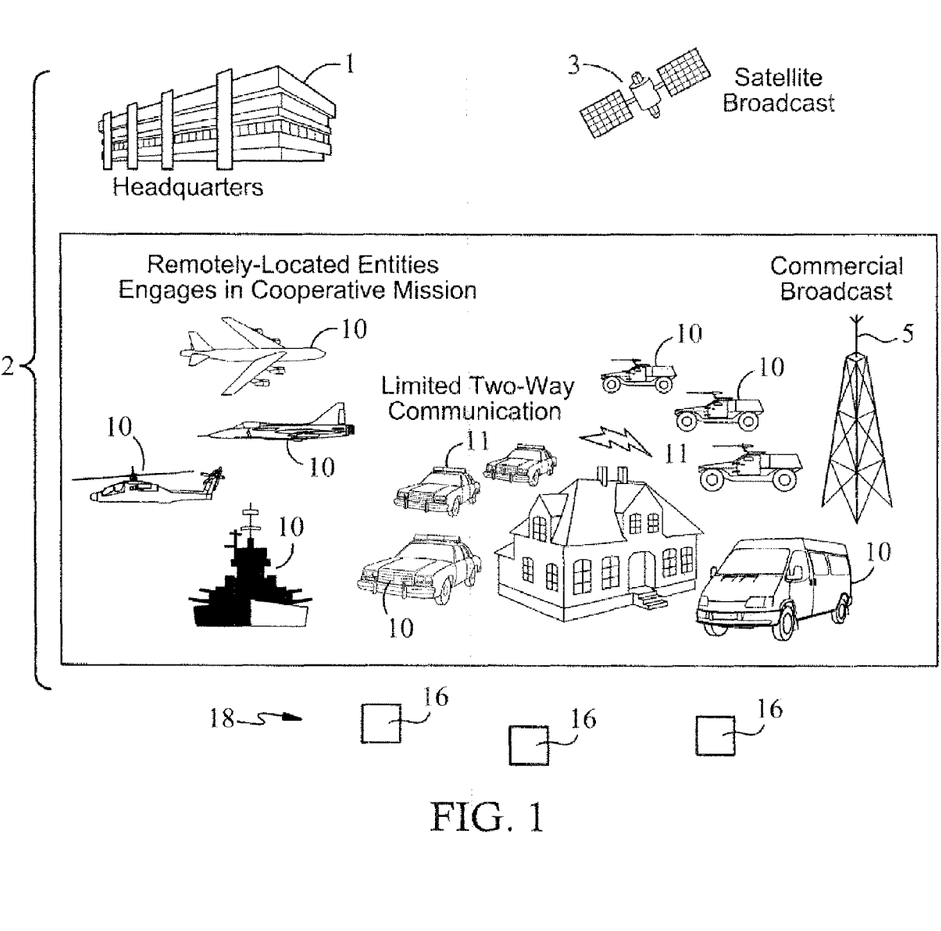
FIG. 1 is a diagram illustrating the present invention.

FIG. 1 is a diagram illustrating the present invention. A headquarters 1 provides entities in a team 9, which are team members 10, with a common set of planning algorithms, data, and mission objectives prior to a mission. One form of loading is transmission via a satellite 3. Other forms of loading may be used. During the mission, the headquarters 1 may update mission objectives and provide other information during the mission, via a long-range downlink, such as a satellite broadcast system. However, communications to or from the headquarters 1 is not necessary. In an autonomous negotiating team (ANT) context, transmission from a headquarters 1 would not be assumed. "Autonomous negotiating team" is a term defined in the art. See for example, United States Patent Application on Ser. No. 09/740,418 filed Dec. 19, 2000, which is commonly owned with this application and whose disclosure is incorporated herein by reference. As indicated in FIG. 1, the team members 10 are located remotely from headquarters 1 but have access to broadcast information from commercial or military satellites 3 as well as information that may be broadcast on commercial radio stations or any other broadcast source 5 in the area. They also have very limited, short-range, low probability of detection opportunities for two-way communications with each other. Each team member 10 comprises a computer, or processor, 11. The team members, including their computers 11, and the headquarters form a system 12. The system 12 comprises the necessary operating members to perform the coordinated operations described below. In an ANT, the headquarters 1 need not be a part or the system 12. In many cases there may be entities 16 that are not part of a team 10, but may be operating individually against the team 10 or as an opposing team 18.

The Predictable Unpredictability Technique

Figure 2:
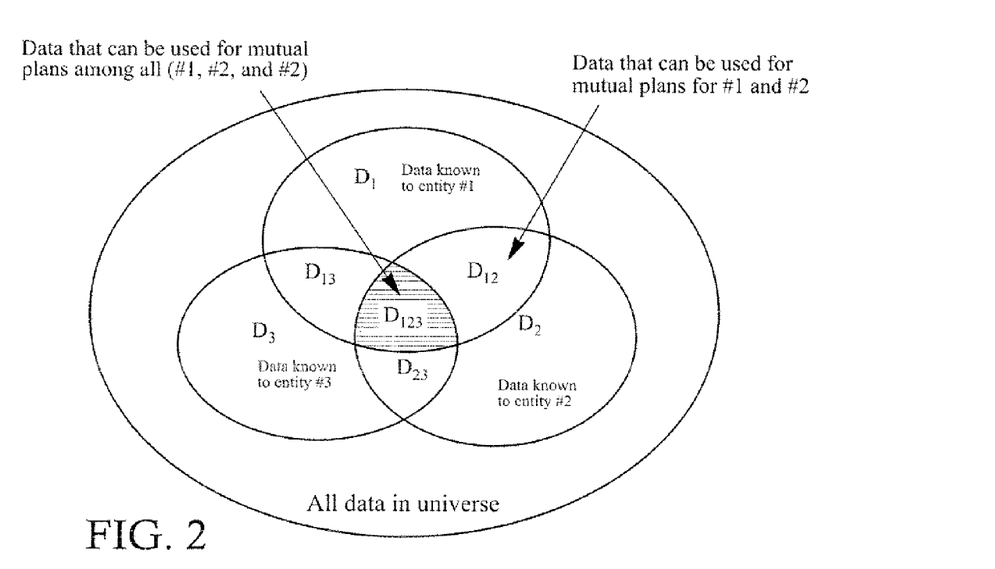
FIG. 2 is a Venn diagram illustrating data sets in common and not in common among team members.

In accordance with the provision of data and programs as described above, each computer 11 in each team member 10 has a set of data, as illustrated in FIG. 2, which is a Venn Diagram. $D_1$ is the total dataset possessed by team member #1, $D_2$ is the dataset possessed by team member #2, $D_3$ by team member #3, and so on.

Each computer 11 is provided with data so that it "knows" what subset (of the total dataset it possesses) is also known by each of the other team members 10. $D_{12}$ is the common data-subset possessed by both #1 and #2 that both know is common, $D_{13}$ is the common data-subset possessed by both #1 and #3, $D_{123}$ is the common data-subset possessed by #1, #2 and #3, and so on.

If the computers 11 used by each team member 10 utilize only the dataset it has in common, including an initial random seed, and the same detailed mission planning and execution algorithms, each will compute bit-for-bit the exact plans for itself and for the other team members 10 on the team 9. Each computer 11 will therefore be able to compute multi-team member plans that, in effect, "predict" exactly what each of the other team members plan to do. If each team member 10 in the team 9 executes its part of the plan, all other team members will know exactly where they will be and what they will be doing, without any need for communications. The net result may be termed "pseudo-centralized planning and coordination" since it has all the advantages of centralized direction, yet avoids the "Achilles heel" of requiring continual communications among team members.

Thus, from the point of view of team members that are on the team, the actions of all other members will be exactly predictable. However, from the point of view of any neutral or opposing team member that does not share the common dataset, the actions of team members will be more or less unpredictable, hence, predictable-unpredictability.

At first, it may appear that this situation is unremarkable, since the same condition can be obtained by giving each team member 10 in a team 9 a copy of the plans for all other team members 10 prior to the mission. The remarkable point is that, with predictable-unpredictability, the same level of coordination may be maintained throughout the mission, despite the acquisition of new information that may require re-planning of the paths and/or tactics of one or all of the team members 10.

Broadcast Data and/or Mission Updates

For example, assume all team members 10 can receive data and/or new or modified mission assignments from some broadcast source 5 (see FIG. 1). In this case, the broadcast data, assumed to be received by all team members 10, increases the extent of $D_{123}$, and thus permits plans to be updated and future actions to be different than they would be if the original plan was followed.

Although they may not be able to communicate directly with each other, or transmit information to the broadcast source, the team members 10 may assume that all other team members 10 will receive the broadcast data. In that case, they may check to see if any new data or mission updates from the broadcast source will cause themselves and/or any of the other team members to modify their plans. If so, the team members 10, will simultaneously change all plans, in a coherent way.

Brief Communications Opportunities

Figure 3:
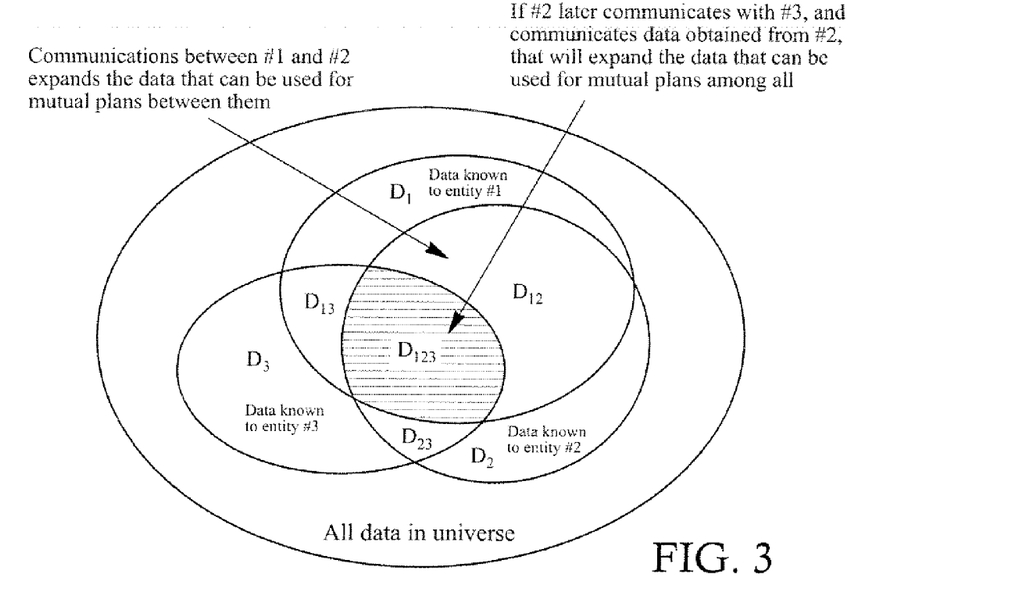
FIG. 3 is a Venn diagram illustrating expansion of common data sets among particular team members.

Furthermore, if two or more team members 10 are able to communicate, however briefly, they may, with a "wink and a nod" exchange what is, in effect, a large volume of information (see FIG. 3). For example, since team member 10 #1 knows the exact plans of all the others, it may anticipate when team member 10 #2 should come within rendezvous (communications) range. At that point, since both #1 and #2 know the exact sub-set of data they have in common, they need only exchange new or modified data. Following that data exchange, they may each re-plan with confidence that the other will come up with an identical plan for itself and for them.

The original plan, as well as back-up plans, will have periodic brief communications opportunities built in, so that all team members will be able to periodically share information with other team members to try to assure that all team members on periodically updated on the situation of all other team members, and this can be accomplished without all team members needing to be in direct contact with all other team members.

Extracting Data from a Negative Event

If a team member 10 fails to show up for a planned rendezvous, that is a clear indicator that it has deviated from the plan, and has been delayed, disabled, destroyed or captured. Both the team member that reached the rendezvous point on-plan, and the delinquent team member know that the plan has been violated. Therefore, both may make use of this information to re-plan (for example, go to an alternative rendezvous location) or fall back on a mission plan that does not require the same level of coordination from the delinquent team member (for example, assume the delinquent team member is captured or destroyed).

If team member 10 #1 subsequently has a communications opportunity with team member 10 #3, it may pass on data acquired from team member 10 #2. In this case, the relayed data (which team member 10 #2, knowing the plans of team member 10 #1 and team member 10 #3, may assume to have been received by team member #3) increases the extent of $D_{123}$. This communications data relay thus permits plans to be updated by all three team members and future actions to be different than they would be if the original plan were followed.

Thus, although they may be able to communicate directly with each other only for brief periods, and may not be able to transmit information to their headquarters 1 source, they may utilize this data for re-planning. They may check to see if any new data or mission updates from the broadcast source will cause themselves and/or any of the other team members to modify their plans. If so, they, and all the other team members, will simultaneously change all plans, in a coherent way.

Operation

Figure 4:
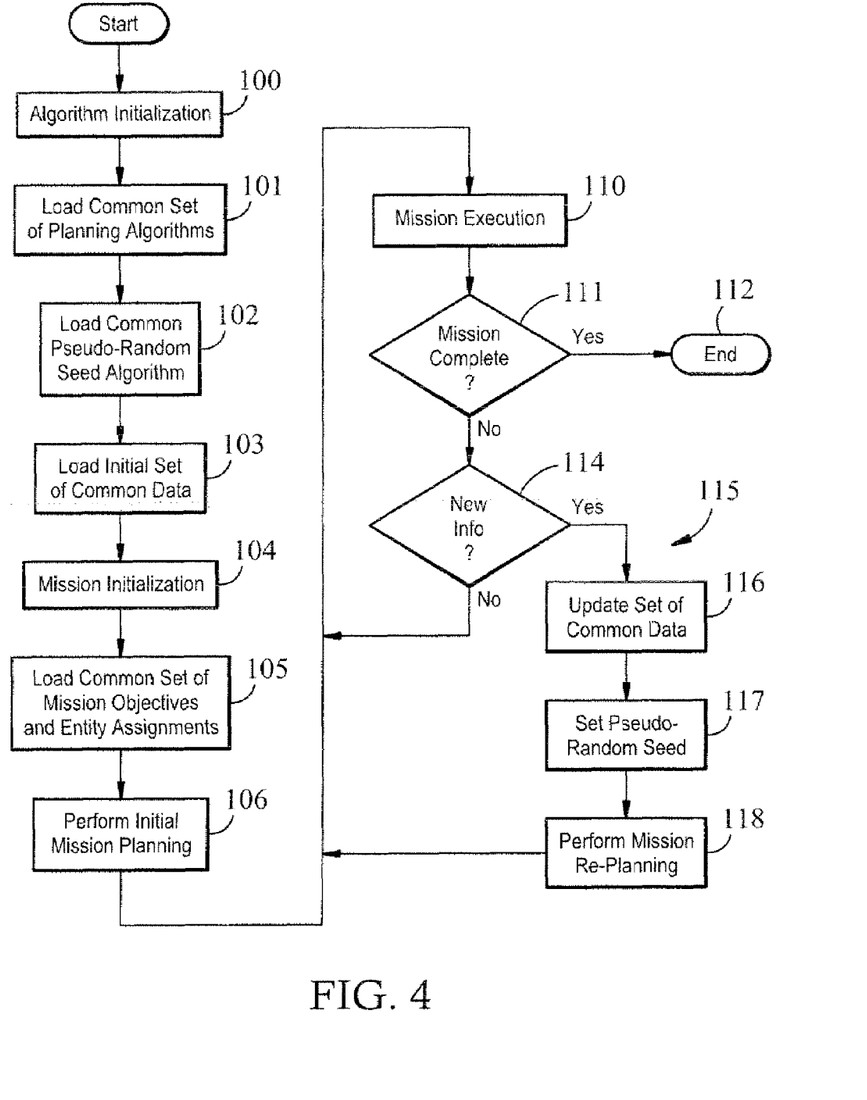
FIG. 4 is a flow diagram of the predictability—unpredictability method embodied in the present invention.

FIG. 4 is a flow diagram for the predictable-unpredictability method, and indicates how "pseudo-centralized planning and coordination" may be achieved.

Algorithm Initialization

Prior to the mission, an algorithm selected to be the operating algorithm must be initialized correctly at step 100 for the computer(s) 11 in each team member 10. Operating algorithms are prior art or other algorithms which define a particular task. An example of such an algorithm is one for a team of vehicles searching an area. Search algorithms are found in, for example: Y. Hwang, Y. Ahuja, N., "Gross Motion Planning—a Survey." *ACM Computing Surveys, Vol.* 24, No. 3, pp. 219–291, September 1992; and Latombe, J., Robot Motion Planning. Kluwer, Boston, Mass., 1991. The specific algorithms do not form part of the present invention. Rather, a known algorithm for performing a task is provided to each team member 10. The present invention enables performance of the task defined by the algorithm so that the benefits of the present invention are obtained. Thus the present invention will also have utility with tasks that will be defined by algorithms that do not yet exist.

It is critical that each team member 10 has an up-to-date copy of identical common planning algorithms. At step 101, the planning algorithm is loaded. It is also critical that each team member has a common method of generating pseudo-random seeds if any of the planning algorithms have "random" functions. (One way to do this would be to make the seed be dependent upon time-of-day, perhaps changing every 10 minutes or so.) Thus, when a broadcast or other transmission event triggers all team members 10 in the team 9 to perform mission re-planning, each team member will start with an identical pseudo-random seed. Finally, an initial set of common data must be loaded into each processor. The data is loaded at step 103. This would include, for example, parameters for use in customizing the planning algorithms for the theater of operations, digital map terrain data, and so on.

Mission Initialization

Next, at step 104, the computers 11 are initialized for the mission. At the outset of the mission, at step 105, a common set of mission objectives and role assignments for each of the team members must be loaded into the computer(s) 11 in each team member. Then, at step 106, each team member 10 will perform initial mission planning. Since the computers 11 are totally deterministic, given an exact set of initial conditions and algorithms, each team member will come up with the exact same, coordinated plan for itself and produce the corresponding plans for each of the other team members 10.

Mission Execution

In step 110, the mission is executed by the team members 10. The mission should be executed according to the plan. If each team member 10 does so, all will remain in coordination. At step 111 the system 12 monitors whether the mission is completed and proceeds At step 114, the predictable-unpredictability method continually monitors for a transmission event. A transmission event includes receipt of new broadcast information from a broadcast source 5, new information that may come by way of low probability of detection burst transmissions whenever team members 10 come within communications range, an unplanned transmission from the headquarters 1 or the absence of a scheduled transmission, such as at a rendezvous. If any data is received in this manner, or, if a communications rendezvous is missed, this event triggers a re-planning cycle 115. If not, mission execution continues at step 110 with the current plan. Thus in accordance with the present invention, presence or absence of transmission event is determined, and a new plan is generated or not based on the presence or absence of input information at step 114.

A mission re-planning cycle 115 comprises the following steps indicated in FIG. 4:

The common set of data is updated at step 116 to reflect the new data held in common by the team members in the team.

The pseudo-random seed is set (e.g., based on time-of-day in 10 minute intervals) at step 117, whereby all team members 10 will have the identical seed. As illustrated with respect to step 102, each team member has the same random number generator.

The mission re-planning algorithms are run and, since digital computers are totally deterministic, given an exact set of initial conditions and algorithms, each team member 10 will produce with the exact same, coordinated re-plan for itself and for each of the other team members.

EXAMPLES

Example 1

Business Scenario

Consider a number of agents of a business who are posted to remote locations. The agents comprise team members 10 and may be buying or selling commodities or stocks, or negotiating sensitive business arrangements with other, possibly competitive, business team members or unfriendly governments.

At any given point in time, they may not be able to communicate directly for a variety of reasons:

They are in a remote area or a backward country where communications are not available or are sometimes out of order, They are concerned that competing business team members or hostile governments may intercept any communications, and/or They may not even utilize encrypted communications over commercial systems because that would reveal their contacts in the remote area or whom they are really working for.

At the same time, they may all be receiving common broadcast data, such as business news, stock market transactions, commodity prices, news events, and so on from CNN or other satellite sources. On occasion, they may be able to make short telephone calls and exchange limited amounts of data with each other, and relay data from other agents.

With predictable-unpredictability, each agent may respond to new business information and re-plan its pricing strategy, along with the detailed plans and strategy of other agents, with assurance that the other agents will do the same, maintaining exact coordination.

Example 2

Emergency Response Unit Scenario

Consider a number of emergency response vehicles attending to an area hit by a storm, flood, explosion, toxic spill or gas release, etc. These emergency units need to locate, treat, and help evacuate people who are victims of the disaster.

At any given point in time, they may not be able to communicate directly for a variety of reasons:

They are on opposite sides of a hill or other obstructions,

Cell phone base stations and the terrestrial telephone network may have been disabled by the disaster, Communications links may be overwhelmed by the number of people trying to use them, and/or They may be in remote locations and lack sufficient transmission power to reach their home base.

At the same time, all emergency response units may be receiving weather, road condition, re-supply, evacuation or other data and/or new or modified mission assignments via a radio broadcast communications link. On occasion, when their paths bring them into proximity, they may be able to transmit short bursts of data to each other, and relay data from other vehicles. If their planned paths bring them into such proximity, and one or more emergency response unit(s) do not transmit, it means that they have been delayed, disabled, or destroyed. In such case, both the delinquent unit and the on-plan unit know that the plan has been disrupted, and may re-plan accordingly (proceed to an alternate rendezvous location or assume the delinquent unit is no longer available for the mission).

With predictable-unpredictability, each emergency response unit may respond to new intelligence data or new or modified mission assignments and re-plan its route in detail, along with the detailed routes of other units, with assurance that the other units will do the same, maintaining exact coordination.

Example 3

Robot Security Device Scenario

Consider a number of security robots. These small, semi-autonomous devices (1-foot cube or less) are being designed so police, emergency services, or military personnel may toss them over a fence or through a window of a building to safely search the area. Teams of these devices will be capable of moving through the search area, utilizing on-board sensors to guide their movements and locate people or objects of interest.

Such security robots may be used to locate and possibly clean up an area where there has been a toxic or radioactive spill, find survivors of a disaster, or detect and possibly disable hostile persons who may be holed up in the area.

At any given point in time, they may not be able to communicate directly for a variety of reasons:

Their communications devices are optical and require direct line of sight,

They are on opposite sides of a metal wall,

They lack sufficient transmission power, and/or

There is concern that hostile forces might detect any radio transmission and give away their position.

At the same time, all members of the team may be receiving intelligence data and/or new or modified mission assignments via a radio broadcast communications link. On occasion, when their paths bring them into proximity and direct line of sight, they may be able to transmit short bursts of data to each other, and relay data from other vehicles, using optical means. If their planned paths bring them into such proximity, and one or more robot(s) do not transmit, it means that they have been delayed, disabled, or captured. In such case, both the delinquent robot and the on-plan robot know that the plan has been disrupted, and may re-plan accordingly (proceed to an alternate rendezvous location or assume the delinquent robot is no longer available for the mission).

With predictable-unpredictability, each robot may respond to new intelligence data or new or modified mission assignments and replan its route in detail, along with the detailed routes of other robots, with assurance that the other robots will do the same, maintaining exact coordination.

Example 4

Space Exploration Scenario

Consider a number of Lunar or Mars exploration robots.

At any given point in time, they may not be able to communicate directly for a variety of reasons:

They are on opposite sides of a hill or other obstructions,

They lack sufficient transmission power or need to conserve power to extend their mission time, They are not within line of sight of an orbiting mother ship or of the Earth, and/or Extreme space distances may impose unacceptable time delays.

At the same time, all robots may be receiving data and/or new or modified mission assignments via a radio broadcast communications link. On occasion, when their paths bring them into proximity, they may be able to transmit short bursts of data to each other, and relay data from other vehicles.

With predictable-unpredictability, each robot may respond to new intelligence data or new or modified mission assignments and re-plan its route in detail, along with the detailed routes of other robots, with assurance that the other robots will do the same, maintaining exact coordination.

Example 5

Peacekeeping Scenario

Consider a multi-national peacekeeping mission such as that by UN-sponsored forces among the competitive governments and rebel combatants in Bosnia. There may be a need to coordinate sensitive peace negotiations and searches with military action, without overtly revealing the connections between the two. The peacekeeping team consists of a number of force elements that must travel to remote locations in unfriendly, often technologically backward territory to monitor cease-fire compliance or search for hidden stashes of weapon or evidence of atrocities.

At any given point in time, they may not be able to communicate directly for a variety of reasons:

They are in a remote area or a backward country where communications are not available or are sometimes out of order, They are concerned that any communications may be intercepted by the various hostile governments and rebel forces and used to thwart their peacekeeping activities, and/or They may be secretly cooperating with one or more of the combatant forces, and may not want to reveal that fact.

At the same time, they may all be receiving common broadcast data, such as world and political news events, and so on from CNN or other satellite sources, or from domestic broadcast sources in the unfriendly country. On occasion, they may be able to make short telephone calls and exchange limited amounts of data with each other, and relay data from other agents.

With predictable-unpredictability, each group of peacekeepers may respond to the news and re-plan its travel, search, security, and possible attack activities, along with the detailed plans and strategy of other peacekeeping force elements, with assurance that the others will do the same, maintaining exact coordination. As an example, certain discoveries or news may cause the planning systems to order force elements in remote locations to assume a defensive posture or withdraw from a given region prior to an expected missile strike or bombing run. In this case, headquarters 1, which also has access to the same planning algorithms, will not need to issue a specific security order, yet they would be confident that their force elements will do so, apparently "on their own".

Example 6

Weapons Inspector Scenario

Consider UNSCOM weapons inspectors in Iraq, or an equivalent situation in another part of the world in the future. The inspection team consists of a number of agents who are traveling to remote locations in unfriendly, often technologically backward territory to monitor compliance or search for evidence of weapons of mass destruction.

At any given point in time, they may not be able to communicate directly for a variety of reasons:

They are in a remote area or a backward country where communications are not available or are sometimes out of order, They are concerned that any communications may be intercepted by the hostile government and used to thwart their inspections, and/or They may be cooperating with indigenous, anti-government elements in Iraq, and may not want to reveal that cooperation and coordination.

At the same time, they may all be receiving common broadcast data, such as world and political news events, and so on from CNN or other satellite sources, or from domestic broadcast sources in the unfriendly country. On occasion, they may be able to make short telephone calls and exchange limited amounts of data with each other, and relay data from other agents.

With predictable-unpredictability, each group of inspectors may respond to the news and re-plan its travel and inspection activities, along with the detailed plans and strategy of other inspector groups, with assurance that the other inspectors and agents will do the same, maintaining exact coordination. As an example, certain discoveries or news may cause the planning systems to order a withdrawal from a given region prior to an expected missile strike or bombing run. In this case, headquarters, which also has access to the same planning algorithms, will not need to issue a specific withdrawal order, yet they would be confident that their inspectors will do so, apparently "on their own".

Example 7

Scout Vehicle Scenario

Consider a team of scout vehicles (either airborne or ground based, or a combination of both) who are searching an area. At any given point in time, they may not be able to communicate directly for a variety of reasons:

They are on opposite sides of a hill,

Hostile forces are jamming their communications channel,

They lack sufficient transmission power,

They are concerned that any transmission might be detected by hostile forces and give away their position, and/or They cannot access a satellite uplink due to lack of individual uplink, bandwidth resources.

At the same time, all members of the team may be receiving intelligence data and/or new or modified mission assignments via a broadcast communications link.

On occasion, when their paths bring them into proximity, they may be able to transmit bursts of data to each other, and relay data from other vehicles, using low probability of detection means. If their planned paths bring them into such proximity, and one or more team member(s) do not transmit, it means that they have been delayed, disabled, or captured. In such case, both the delinquent vehicle and the on-plan vehicle know that the plan has been disrupted, and may re-plan accordingly (proceed to an alternate rendezvous location or assume the delinquent vehicle is no longer available for the mission).

With predictable-unpredictability, team members may respond to new intelligence data or new or modified mission assignments and re-plan their routes in detail, along with the detailed routes of other team members, with assurance that the other team members will do the same, maintaining exact coordination.

Use of the method of the present invention will produce plans that:
   Are flexible (rather than brittle),
   Make use of information that becomes available after the mission is initiated,
   Fully exploit the intelligence and status information and coordinating power made possible by Global Satellite Broadcasting and the Tactical Internet,
   Handle both expected and unexpected contingencies, and
   Are far less dependent upon reliable communications.

The present invention provides a novel approach for "pseudo-centralized planning and coordination" of a team of team members that lack reliable two-way communications. This method is applicable to remotely located team members whose plans and actions must change dynamically in response to changes in circumstances, yet remain coordinated and predictable to team members, but unpredictable to competitive forces. This method is capable of using future technological developments, and exploits technological trends that will become pervasive in the near future, including commercial Satellite Broadcasting, the commercial Internet, the military Tactical Internet and the military Global Broadcast System. As the example scenarios attest, this method is applicable to domestic security and international trade domains, where agents must work in remote territory and their two-way communications opportunities must be limited. This invention will lead to a broad range of applications in both military and commercial marketplaces.

The invention has been written with a view toward enabling those of ordinary skill in the art to produce many forms of the present invention by those illustrated in the specific examples above.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. A method of coordinating team members, each team member comprising a mission processor, in real time for continued coordinated operation in the absence of reliable communications between team members comprising the steps of:
   prior to a mission, providing each team member with common programs and data for a mission, the data including identity of programs and data supplied to other team members and providing to each team member a pseudo random seed for use in conjunction with random functions;
   giving each team member an initial set of conditions, whereby each team member performs deterministically to generate a same plan for itself and each of the other team members;
   monitoring for a transmission event; and
   responding to a transmission event by generating a re-planning operation, whereby each team member will produce a coordinated replan for itself and each other team member, whereby the team members remain coordinated.

2. The method according to claim 1 wherein said step of monitoring for a transmission event comprises detecting the presence or absence of a scheduled transmission from a team member.

3. The method according to claim 1 wherein said step of monitoring for a transmission event comprises receiving a transmission from a broadcast source.

4. The method according to claim 1 wherein said step of monitoring for a transmission event comprises receiving a transmission directed to team members from a headquarters.

5. The method according to claim 1 wherein said step of monitoring for a transmission event comprises receiving a commercial satellite broadcast.

6. The method according to claim 1 wherein said step of monitoring for a transmission event comprises maintaining a receiver for receiving a burst transmission from another team member.

7. The method according to claim 1 wherein said step of monitoring for a transmission event comprises receiving a transmission indicative of a condition as reported by a team member.

8. The method of claim 1 further comprising providing a system of said team members and a headquarters for communicating with said team members and further comprising the step of communicating between at least one team member and said headquarters.

9. The method of claim 8 further comprising communication of changes in a plan from a team member or members to said headquarters.

10. The method of claim 9 further comprising the step of generation of an updated plan by said headquarters and transmission of said updated plan to said team members in response to the communication by said team member or members.

11. A system for coordinating a team comprising team members, each team member comprising a mission processor in real time for continued coordinated operation in the absence of reliable communications between team members comprising:
   means for providing each team member with common programs and data for a mission prior to a mission, the data including identity of programs and data supplied to other team members and providing to each team member a pseudo random seed for use in conjunction with random functions;
   loading means providing each team member an initial set of conditions, whereby each team member performs deterministically to generate a same plan for itself and each of the other team members;
   monitoring means for a transmission event; and
   means for responding to a transmission event by generating a re-planning operation, whereby each team member will produce a coordinated replan for itself and each other team member, whereby the team members remain coordinated.

12. The system according to claim 11 wherein said means for monitoring for a transmission event means for detecting the presence or absence of a scheduled transmission from a team member.

13. The system according to claim 11 wherein said means for monitoring for a transmission event comprises means for receiving a transmission from a broadcast source.

14. The system according to claim 11 wherein means for monitoring for a transmission event comprises means for receiving a transmission directed to team members from a headquarters.

15. The system according to claim 11 wherein means for monitoring for a transmission event comprises means receiving a commercial satellite broadcast.

16. The system according to claim 11 wherein means for monitoring for a transmission event comprises a receiver for receiving a burst transmission from another team member.

17. The system according to claim 11 wherein said means for monitoring for a transmission event comprises means receiving a transmission indicative of a condition as reported by a team member.

18. The system of claim 11 further comprising a system of said team members and a headquarters for communicating with said team members and further comprising means for communicating between at least one team member and said headquarters.

19. The system of claim 18 further comprising means for communication of changes in a plan from a team member or members to said headquarters.

20. The system of claim 19 further comprising means for generation of an updated plan by said headquarters and transmission of said updated plan to said team members in response to the communication by said team member or members.

* * * * *

UNITED STATES PATENT AND TRADEMARK OFFICE
CERTIFICATE OF CORRECTION

PATENT NO.         : 7,162,199 B1                                         Page 1 of 1
APPLICATION NO.    : 09/886787
DATED              : January 9, 2007
INVENTOR(S)        : Ira Glickstein et al.

It is certified that error appears in the above-identified patent and that said Letters Patent is hereby corrected as shown below:

Title page # 54 and Col. 1
The title of the invention on the patent currently reads as follows: "Method for Real-Time Team Coordination With Unreliable Communications Between Team Members". The correct title of the invention on the patent should read as follows:
--Method for Real-Time Team Coordination With Unreliable Communications Between Team Members--

Signed and Sealed this

Twenty-fourth Day of April, 2007

JON W. DUDAS
*Director of the United States Patent and Trademark Office*